US011924684B2

(12) United States Patent
Takano

(10) Patent No.: US 11,924,684 B2
(45) Date of Patent: Mar. 5, 2024

(54) ELECTRONIC APPARATUS, METHOD FOR CONTROLLING AN ELECTRONIC APPARATUS, AND NON-TRANSITORY RECORDING MEDIUM

(71) Applicant: Satoshi Takano, Kanagawa (JP)

(72) Inventor: Satoshi Takano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 17/317,991

(22) Filed: May 12, 2021

(65) Prior Publication Data

US 2021/0400530 A1    Dec. 23, 2021

(30) Foreign Application Priority Data

Jun. 23, 2020    (JP) .................................. 2020-108046

(51) Int. Cl.
| | |
|---|---|
| *H04W 28/06* | (2009.01) |
| *H04W 28/02* | (2009.01) |
| *H04W 28/18* | (2009.01) |
| *H04W 84/12* | (2009.01) |

(52) U.S. Cl.
CPC ....... *H04W 28/06* (2013.01); *H04W 28/0268* (2013.01); *H04W 28/0273* (2013.01); *H04W 28/18* (2013.01); *H04W 84/12* (2013.01)

(58) Field of Classification Search
CPC ............. H04W 28/06; H04W 28/0268; H04W 28/0273; H04W 28/18; H04W 84/12
USPC ....................................................... 370/329
See application file for complete search history.

(56) References Cited

U.S. PATENT DOCUMENTS

| | | | |
|---|---|---|---|
| 2009/0161174 A1 | 6/2009 | Takeuchi et al. | |
| 2012/0194838 A1 | 8/2012 | Takano | |
| 2013/0100472 A1* | 4/2013 | Kamoi ............... | H04N 1/32448 358/1.15 |
| 2014/0078543 A1 | 3/2014 | Kawasaki et al. | |
| 2016/0302244 A1* | 10/2016 | Son ....................... | H04W 76/11 |
| 2017/0046294 A1 | 2/2017 | Takano | |
| 2017/0264823 A1 | 9/2017 | Takano | |

(Continued)

FOREIGN PATENT DOCUMENTS

| | | |
|---|---|---|
| JP | 2014-197333 | 10/2014 |
| JP | 2017-010272 | 1/2017 |

*Primary Examiner* — Kwang B Yao
*Assistant Examiner* — Syed M Bokhari
(74) *Attorney, Agent, or Firm* — IPUSA, PLLC

(57) ABSTRACT

An electronic apparatus includes a sub-system that receives, from a wireless LAN module, incoming data including wireless LAN packets according to plural communication methods and a main system including a processor that process the incoming data. The sub-system includes an interface circuit and a sub-processor. The interface circuit acquires a data length of each of the wireless LAN packets from a header of the wireless LAN packet. Based on MAC addresses included in the wireless LAN packet, the interface circuit identifies a communication method of the wireless LAN packet. Based on the data length and the communication method of the wireless LAN packet, the interface circuit transfers the wireless LAN packet to one of different storage areas respectively corresponding to the communication methods. The sub-processor transfers the wireless LAN packet from the one of the different storage areas to the main system.

11 Claims, 10 Drawing Sheets

(56) References Cited

U.S. PATENT DOCUMENTS

2017/0336769 A1\* 11/2017 Aruga .................. G05B 19/042
2021/0303236 A1\* 9/2021 Park ..................... H04L 9/0643

\* cited by examiner

ELECTRONIC APPARATUS, METHOD FOR CONTROLLING AN ELECTRONIC APPARATUS, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-108046 filed on Jun. 23, 2020 in the Japan Patent Office, the entire disclosure of which is hereby incorporated by reference herein.

BACKGROUND

Technical Field

The present invention relates to an electronic apparatus, a method for controlling an electronic apparatus, and a non-transitory recording medium.

Description of the Related Art

An electronic apparatus such as an image forming apparatus, for example, uses a variety of communication interfaces to receive electronic data to be processed. A wired local area network (LAN) is a typical communication interface. There is also an electronic apparatus equipped with a wireless LAN module including a secure digital input/output (SDIO) interface, for example, as a communication interface.

For example, to reduce the power consumption in a low power consumption mode, there is an image forming apparatus equipped with the wireless LAN module including the SDIO interface so that the wireless LAN module analyzes packets and transfers the analyzed packets to a main system of the image forming apparatus.

According to the technique of the image forming apparatus, data is read with multi-block read to increase the data transfer rate of the SDIO interface. In this case, a plurality of wireless LAN packets are transferred in one block, and thus data analysis is executed in a processor of the main system, resulting in a possible increase in the load on the processor.

The packets received by the wireless LAN module (hereinafter referred to as the incoming data) may include packets according to a plurality of communication methods, such packets transmitted from an access point and packets transmitted in accordance with the wireless fidelity (Wi-Fi) Direct (registered trademark) standard, for example. In this case, in response to receipt of the incoming data from the wireless LAN module, the processor classifies the packets by reading header information from each of the packets. Such a process increases the load on the processor, and if the processor fails to keep up with processing demands, some of the incoming data may be left unprocessed.

SUMMARY

In one embodiment of this invention, there is provided an electronic apparatus that includes, for example, a sub-system and a main system. The sub-system receives, from a wireless local area network module, incoming data including a plurality of wireless local area network packets according to a plurality of communication methods. The main system includes a processor that processes the incoming data. The sub-system includes an interface circuit and a sub-processor. The interface circuit acquires a data length of each of the plurality of wireless local area network packets from a header of the each of the plurality of wireless local area network packets. Based on a plurality of media access control addresses included in the each of the plurality of wireless local area network packets, the interface circuit identifies a communication method of the each of the plurality of wireless local area network packets. Based on the data length and the communication method of the each of the plurality of wireless local area network packets, the interface circuit transfers the each of the plurality of wireless local area network packets to one of a plurality of different storage areas respectively corresponding to the plurality of communication methods. The sub-processor transfers the each of the plurality of wireless local area network packets from the one of the plurality of different storage areas to the main system.

In one embodiment of this invention, there is provided a method for controlling an electronic apparatus including a sub-system and a main system. The method is performed by the sub-system of the electronic apparatus. The method includes, for example, receiving, from a wireless local area network module, incoming data including a plurality of wireless local area network packets according to a plurality of communication methods, acquiring a data length of each of the plurality of wireless local area network packets from a header of the each of the plurality of wireless local area network packets, identifying a communication method of the each of the plurality of wireless local area network packets based on a plurality of media access control addresses included in the each of the plurality of wireless local area network packets, transferring, based on the data length and the communication method of the each of the plurality of wireless local area network packets, the each of the plurality of wireless local area network packets to one of a plurality of different storage areas respectively corresponding to the plurality of communication methods, and transferring the each of the plurality of wireless local area network packets from the one of the plurality of different storage areas to the main system as data to be processed.

In one embodiment of this invention, there is provided a non-transitory recording medium storing a plurality of instructions which, when executed by one or more processors in a sub-system of an electronic apparatus including the sub-system and a main system, cause the processors to perform the above-described method for controlling an electronic apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
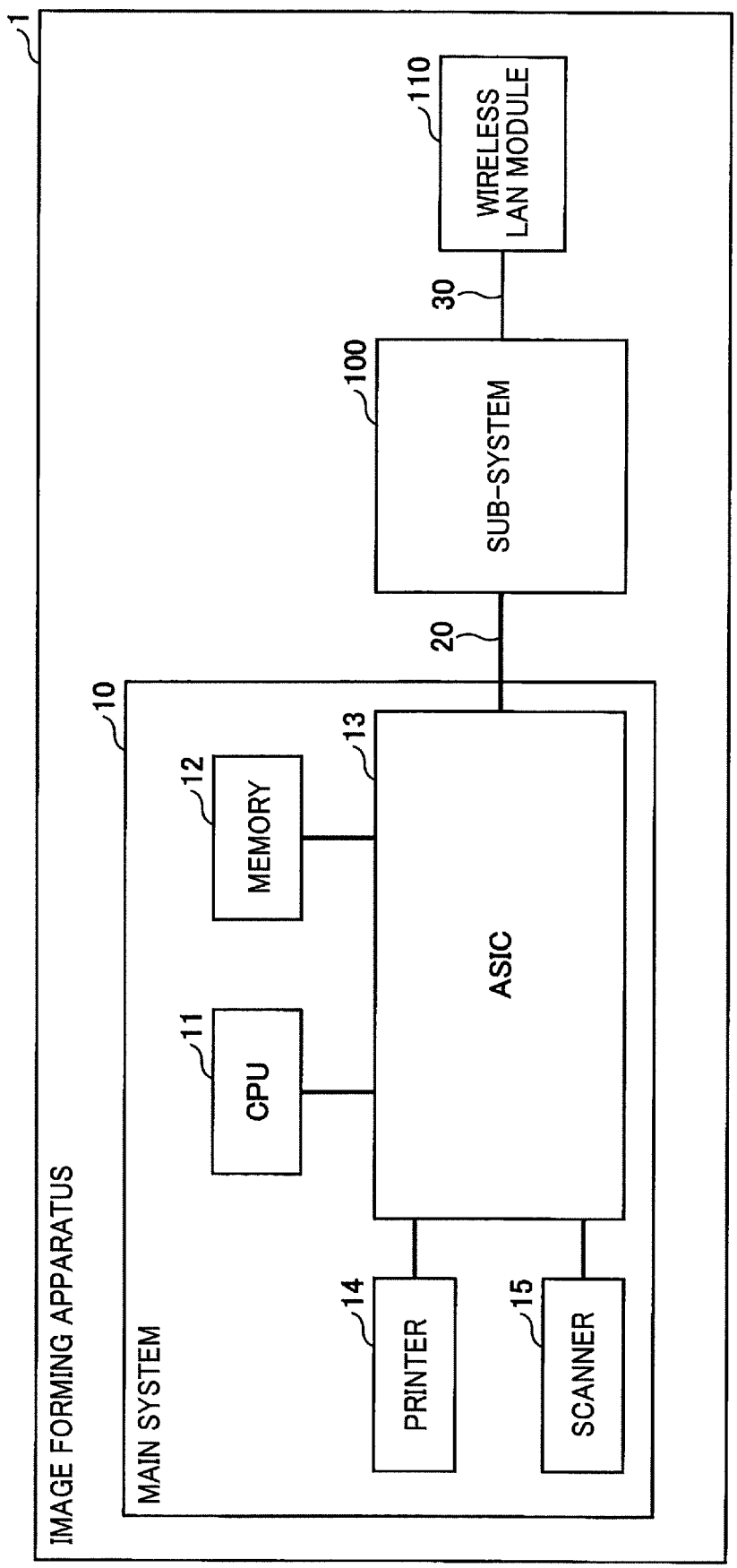
FIG. 1 is a diagram illustrating a configuration example of an image forming apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described in detail below with reference to the drawings.

A configuration of an image forming apparatus according to a first embodiment of the present invention will be described.

FIG. 1 is a diagram illustrating a configuration example of an image forming apparatus 1 of the first embodiment. The image forming apparatus 1 includes a main system 10 and a sub-system 100. The main system 10 executes an image forming process such as a scanning process or a printing process, for example. The sub-system 100 receives wireless local area network (LAN) packets from a wireless LAN module 110, and transfers the wireless LAN packets to the main system 10.

The image forming apparatus 1 is an example of an electronic apparatus that includes the sub-system 100 that receives, from the wireless LAN module 110, incoming data including wireless LAN packets according to a plurality of communication methods and the main system 10 including a processor that processes the incoming data. The electronic apparatus may be a projector (PJ), an interactive whiteboard (IWB) (i.e., an electronic whiteboard capable of communicating with another device), digital signage, or a head-up display (HUD), for example. Further, the electronic apparatus may be an industrial machine, medical equipment, a network home appliance, a connected car, or an in-vehicle device, for example. Furthermore, the electronic apparatus may be an information terminal such as a laptop personal computer (PC), a mobile phone, a smartphone, a tablet terminal, a gaming system, a personal digital assistant (PDA), a digital camera, a wearable PC, or a desktop PC, for example.

The wireless LAN module 110 is connected to the sub-system 100 via a secure digital input/output (SDIO) interface (I/F) 30, for example. The wireless LAN module 110 performs wireless LAN communication in accordance with a plurality of communication methods. For example, the wireless LAN module 110 receives the wireless LAN packets from an access point in a wireless LAN in accordance with a first communication method, and receives the wireless LAN packets from an apparatus such as an information terminal or another electronic apparatus in accordance with a second communication method conforming to a standard such as wireless fidelity (Wi-Fi) Direct (registered trademark), for example.

The sub-system 100 receives, from the wireless LAN module 110, the incoming data including the wireless LAN packets according to the plurality of communication methods, and transfers the incoming data to the main system 10. For example, with multi-block read via an SDIO I/F, the sub-system 100 receives, from the wireless LAN module 110, the incoming data including the wireless LAN packets according to the first communication method and the wireless LAN packets according to the second communication method.

The sub-system 100 further analyzes the incoming data received from the wireless LAN module 110, and stores the wireless LAN packets in different storage areas respectively corresponding to the plurality of communication methods.

The sub-system 100 further transfers the incoming data stored in the different storage areas respectively corresponding to the plurality of communication methods to the main system 10 via a high-speed serial I/F 20 conforming to a standard such as peripheral component interconnect (PCI) Express (registered trademark), for example.

The main system 10 includes a central processing unit (CPU) 11, a memory 12, an application specific integrated circuit (ASIC) 13, a printer 14, and a scanner 15, for example.

The CPU 11 is a processor (i.e., an arithmetic device) that executes a particular program previously stored in the memory 12, for example, to thereby process the incoming data transferred to the memory 12 from the sub-system 100. The memory 12 includes, for example, a random access memory (RAM) being a volatile memory used as a work area for the CPU 11 and a read only memory (ROM) being a non-volatile memory storing programs such as a program for driving the CPU 11. The memory 12 may also include a storage device such as a hard disk drive (HDD) or a solid state drive (SDD), for example.

The ASIC 13 is a large-scale integrated circuit (LSIC) for the image forming process, which includes hardware components for the image forming process by a device such as the printer 14 or the scanner 15. The ASIC 13 includes, for example, an arbiter (i.e., an arbitration circuit), a memory controller, a direct memory access controller (DMAC), and a logic circuit that performs processes such as rotation, zoom-in, and zoom-out of image data.

The printer 14 includes, for example, a printer engine that executes the printing process and a controller that controls the printer engine. The printer 14 executes the image forming process (i.e., the printing process) under the control of the CPU 11 of the main system 10. The scanner 15 includes, for example, a scanner engine that executes the reading of a document and a controller that controls the scanner engine. The scanner 15 executes the scanning process under the control of the CPU 11 of the main system 10.

With the above-described configuration, the CPU 11 prints print data (an example of the incoming data) transferred to the memory 12 from the sub-system 100 with the ASIC 13 and the printer 14, for example.

According to a typical technique, it is the CPU 11 that processes the incoming data received by the wireless LAN module 110, i.e., the incoming data including the wireless LAN packets according to the plurality of communication methods. For example, in response to receipt of the incoming data from the wireless LAN module 110, the CPU 11 analyzes information such as the header information of the respective wireless LAN packets, and classifies the wireless LAN packets based on the respective communication methods. According to this technique, however, the load on the CPU 11 is increased, and if the CPU 11 fails to keep up with processing demands, some of the incoming data may be left unprocessed.

According to the image forming apparatus 1 of the present embodiment, on the other hand, the wireless LAN packets according to the plurality of communication methods received from the wireless LAN module 110 are stored in the memory 12 as classified based on the respective communication methods.

According to the present embodiment, therefore, in the image forming apparatus 1 that receives, from the wireless LAN module 110, the incoming data including the packets according to the plurality of communication methods, the load on the processor (i.e., the CPU 11) processing the incoming data is reduced, thereby preventing the processor from leaving some of the incoming data unprocessed.

A description will be given of a configuration of the sus-system 100 of the first embodiment.

Figure 2:
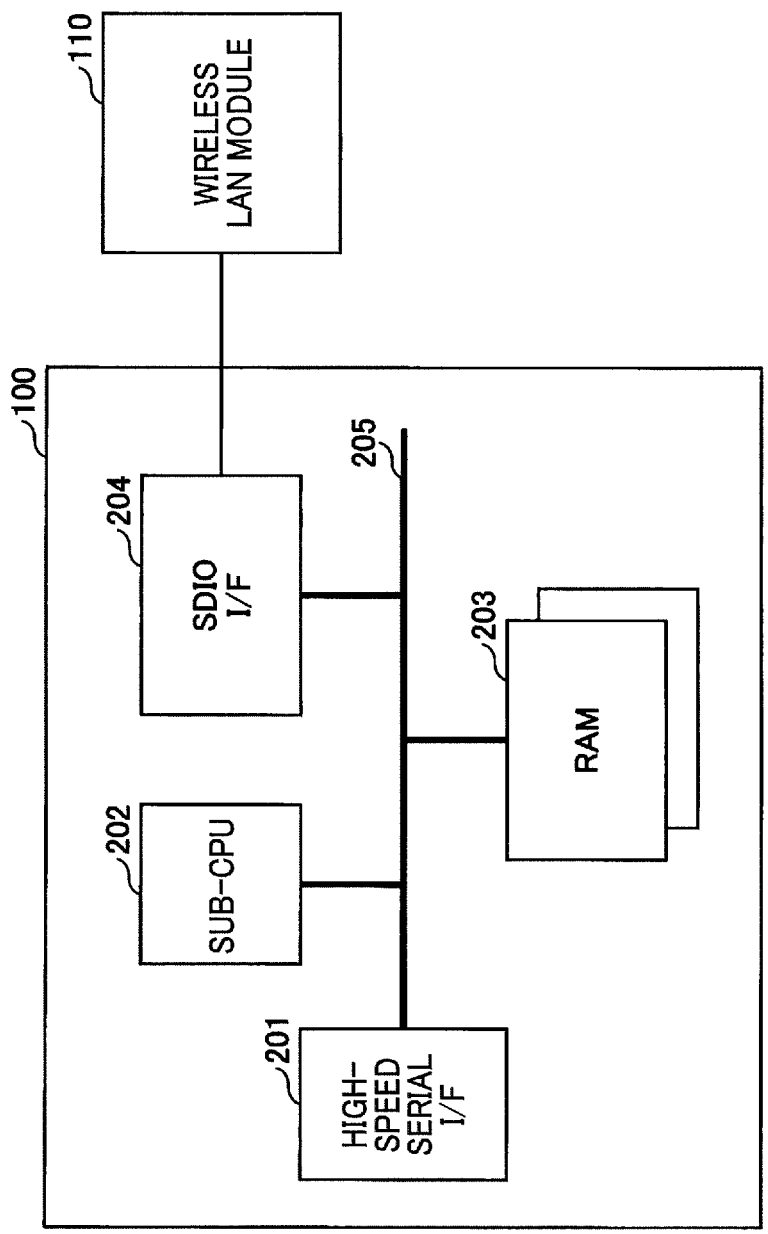
FIG. 2 is a diagram illustrating a configuration example of a sub-system included in the image forming apparatus of the first embodiment.

FIG. 2 is a diagram illustrating a configuration example of the sub-system 100 of the first embodiment. The sub-system 100 includes a high-speed serial I/F 201, a sub-CPU 202, a RAM 203, an SDIO I/F 204, and a bus 205, for example.

The high-speed serial I/F 201 is an interface for performing high-speed serial communication with the main system 10. The interface for the sub-system 100 to communicate with the main system 10, however, may be any desired communication interface.

The sub-CPU 202 is a processor (i.e., an arithmetic device) that executes a particular program to control the sus-system 100. The sub-CPU 202 is desirably a power-saving processor that consumes less power than the CPU 11 of the main system 10 does. The RAM 203 is an example of a memory that temporarily stores the incoming data.

The SDIO I/F 204 is a communication interface that receives, from the wireless LAN module 110 including an SDIO I/F, the incoming data including the wireless LAN packets according to the plurality of communication methods. The SDIO I/F 204 is an example of an interface circuit of the present invention.

The following description will be given on the assumption that the incoming data received by the SDIO I/F 204 includes the wireless LAN packets according to the first communication method received from the access point in the wireless LAN and the wireless LAN packets according to the second communication method conforming to a standard such as Wi-Fi Direct.

The bus 205 is connected to the above-described components of the sub-system 100 to transmit therebetween signals such as an address signal, a data signal, and various control signals, for example.

A configuration example of the SDIO I/F 204 of the first embodiment will be described.

Figure 3:
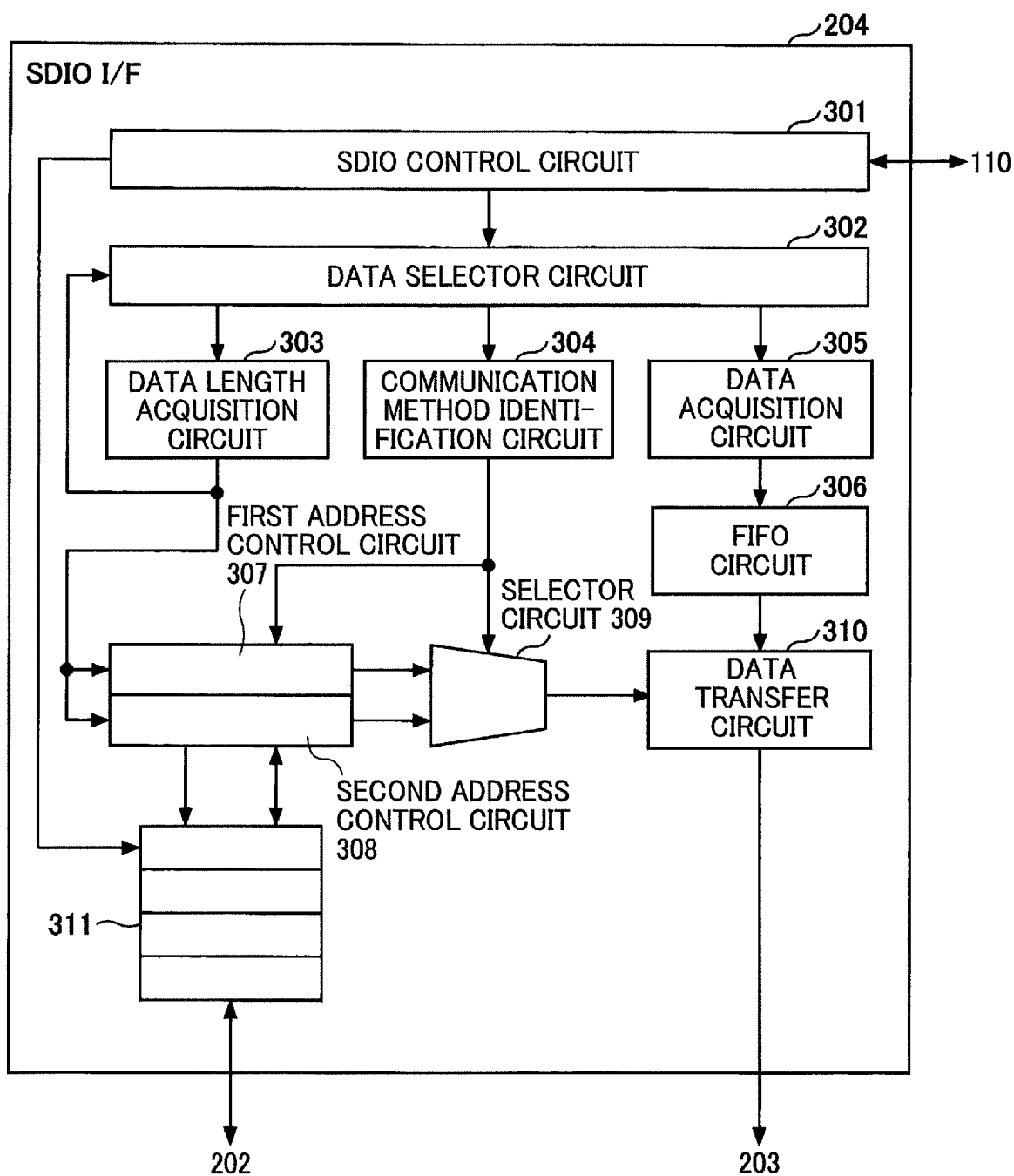
FIG. 3 is a diagram illustrating a configuration example of a secure digital input/output (SDIO) interface (I/F) included in the sub-system of the first embodiment.

FIG. 3 is a diagram illustrating a configuration example of the SDIO I/F 204 of the first embodiment. The SDIO I/F 204 includes an SDIO control circuit 301, a data selector circuit 302, a data length acquisition circuit 303, a communication method identification circuit 304, a data acquisition circuit 305, a first-in, first-out (FIFO) circuit 306, a first address control circuit 307, a second address control circuit 308, a selector circuit 309, a data transfer circuit 310, and a register 311, for example.

The SDIO control circuit 301 controls the wireless LAM module 110 including an SDIO I/F. For example, in response to receipt of a receive interrupt from the wireless LAM module 110, the SDIO control circuit 301 notifies the sub-CPU 202 of the receive interrupt via the register 311. The SDIO control circuit 301 further receives, from the wireless LAM module 110, the incoming data including the wireless LAN packets according to the first communication method and the wireless LAN packets according to the second communication method.

The data selector circuit 302 sequentially acquires the wireless LAN packets included in the incoming data. Each of the wireless LAN packets is a wireless LAN packet 400 as illustrated in FIG. 4, for example.

Figure 4:
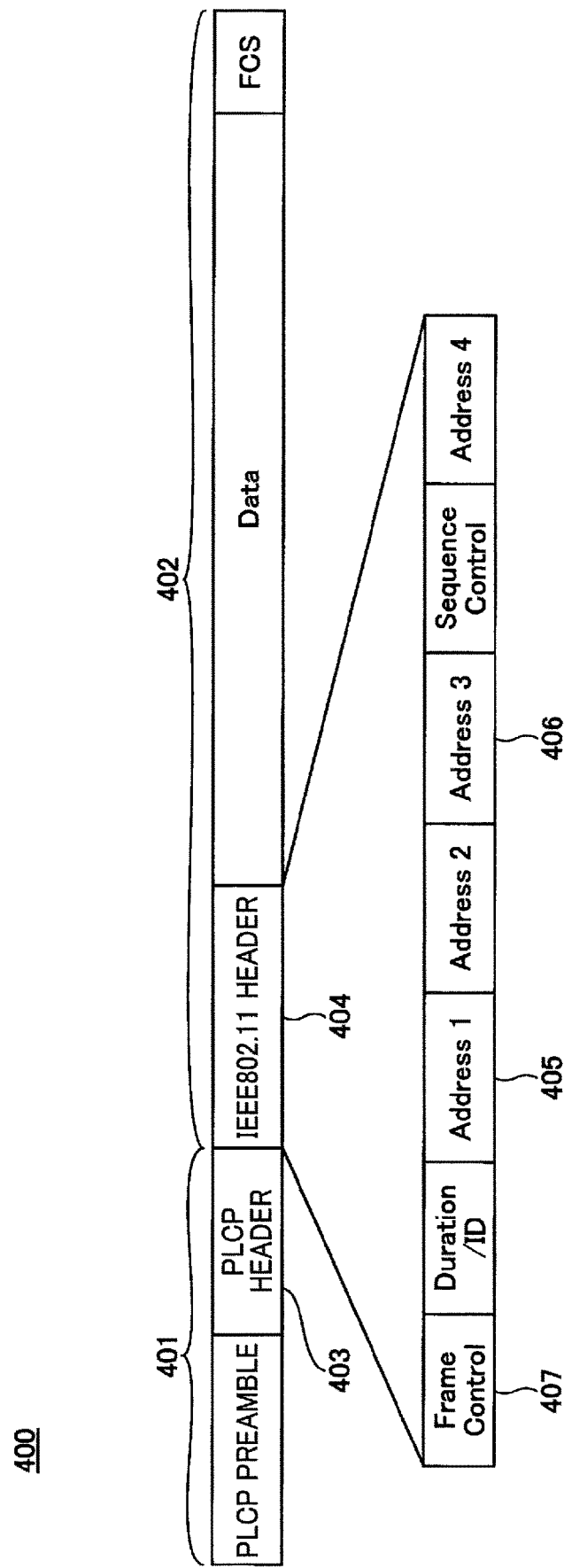
FIG. 4 is a diagram illustrating an example of the format of a wireless local area network (LAN) packet of the first embodiment.

FIG. 4 is a diagram illustrating an example of the format of the wireless LAN packet 400 of the first embodiment. The wireless LAN packet 400 includes a header 401 and data 402. The wireless LAN packet 400 is also referred to as the wireless LAN frame. The header 401 is also referred to as the physical header. The data 402 is also referred to as the media access control (MAC) frame.

The data length acquisition circuit 303 acquires, from the wireless LAN packet 400 as illustrated in FIG. 4, for example, a physical layer convergence protocol (PLCP) header 403 included in the header 401. The PLCP header 403 contains information such as the modulation method (i.e., the transmission rate) and the data length of the wireless LAN packet 400, for example. The data length acquisition circuit 303 acquires the data length of the wireless LAN packet 400 from the PLCP header 403.

The communication method identification circuit 304 acquires, from an Institute of Electrical and Electronic Engineers (IEEE) 802.11 header 404 of the wireless LAN packet 400 illustrated in FIG. 4, for example, the value of an address 1 field 405 and the value of an address 3 field 406, for example. The IEEE 802.11 header 404 includes an address 1 field, an address 2 field, an address 3 field, and an address 4 field. The address 1 to 4 fields of the IEEE 802.11 header 404 are set with values that vary depending on the network configuration (e.g., the MAC address of a transmission destination, the MAC address of a transmission source, and the basic service set identifier (BSSID)). A frame control field 407 in FIG. 4 will be described later.

If the value in the address 1 field 405 and the value in the address 3 field 406 are the same, for example, the communication method identification circuit 304 identifies the wireless LAN packet 400 as the wireless LAN packet according to the second communication method conforming to a standard such as Wi-Fi Direct. If the value in the address 1 field 405 and the value in the address 3 field 406 are different, on the other hand, the communication method identification circuit 304 identifies the wireless LAN packet 400 as the wireless LAN packet according to the first communication method transmitted from an access point, for example. The communication method identification circuit 304 further transmits a signal (or information) to the first address control circuit 307 and the selector circuit 309 to notify that the communication method of the wireless LAN packet 400 is the first communication method, or transmits a signal (or information) to the second address control circuit 308 and the selector circuit 309 to notify that the communication method of the wireless LAN packet 400 is the second communication method.

The data acquisition circuit 305 transfers the wireless LAN packet 400 as illustrated in FIG. 4 to the data transfer circuit 310 via the FIFO circuit 306. The FIFO circuit 306 is a first-in, first-out buffer.

Based on the data length acquired by the data length acquisition circuit 303 and the communication method identified by the communication method identification circuit 304, the first address control circuit 307 determines the address of the storage area to which the wireless LAN packet according to the first communication method is transferred.

For example, the start address of the storage area for storing the wireless LAN packet according to the first communication method is previously set in the register 311 by the sub-CPU 202, for example. Based on the start address and the data length acquired by the data length acquisition circuit 303, the first address control circuit 307 stores, in the register 311, a first address representing the next read position of the wireless LAN packet according to the first communication method, and manages the stored first address.

For example, if the communication method of the wireless LAN packet 400 is the first communication method, the first address control circuit 307 reads the first address from the register 311 and outputs the first address to the selector circuit 309. The first address control circuit 307 further adds the data length acquired by the data length acquisition circuit 303 to the first address stored in the register 311 to update the first address.

Similarly, based on the data length acquired by the data length acquisition circuit 303 and the communication method identified by the communication method identification circuit 304, the second address control circuit 308 determines the address of the storage area to which the wireless LAN packet according to the second communication method is transferred.

For example, the start address of the storage area for storing the wireless LAN packet according to the second communication method is previously set in the register 311 by the sub-CPU 202, for example. Based on the start address and the data length acquired by the data length acquisition circuit 303, the second address control circuit 308 stores, in the register 311, a second address representing the next write position of the wireless LAN packet according to the second communication method, and manages the stored second address.

For example, if the communication method of the wireless LAN packet 400 is the second communication method, the second address control circuit 308 reads the second address from the register 311 and outputs the second address to the selector circuit 309. The second address control circuit 308 further adds the data length acquired by the data length acquisition circuit 303 to the second address stored in the register 311 to update the second address.

The first address control circuit 307 and the second address control circuit 308 are examples of an address control circuit that determines the transfer destination address of the wireless LAN packet 400 based on the data length and the communication method of the wireless LAN packet 400. The first address control circuit 307 and the second address control circuit 308 may be included in one address control circuit, for example. Further, the address control circuit may include three or more address control circuits respectively corresponding to three or more communication methods.

The selector circuit 309 selects the storage area to which the wireless LAN packet 400 is transferred in accordance with the communication method identified by the communication method identification circuit 304. If the communication method identified by the communication method identification circuit 304 is the first communication method, for example, the selector circuit 309 outputs the first address output from the first address control circuit 307 to the data transfer circuit 310. If the communication method identified by the communication method identification circuit 304 is the second communication method, on the other hand, the selector circuit 309 outputs the second address output from the second address control circuit 308 to the data transfer circuit 310.

The data transfer circuit 310, which has the configuration of a DMAC, for example, transfers the wireless LAN packet 400 received from the data acquisition circuit 305 to the address output from the selector circuit 309.

Figure 5A:
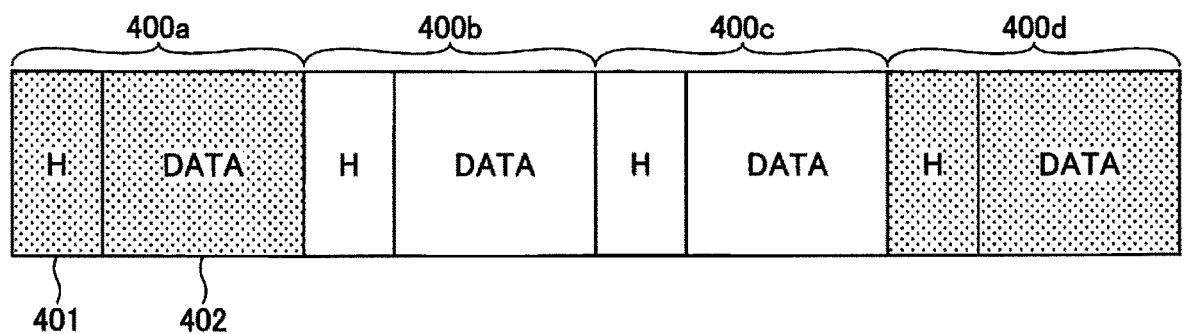
FIGS. 5A and 5B are diagrams illustrating incoming data of the first embodiment.
Figure 5B:
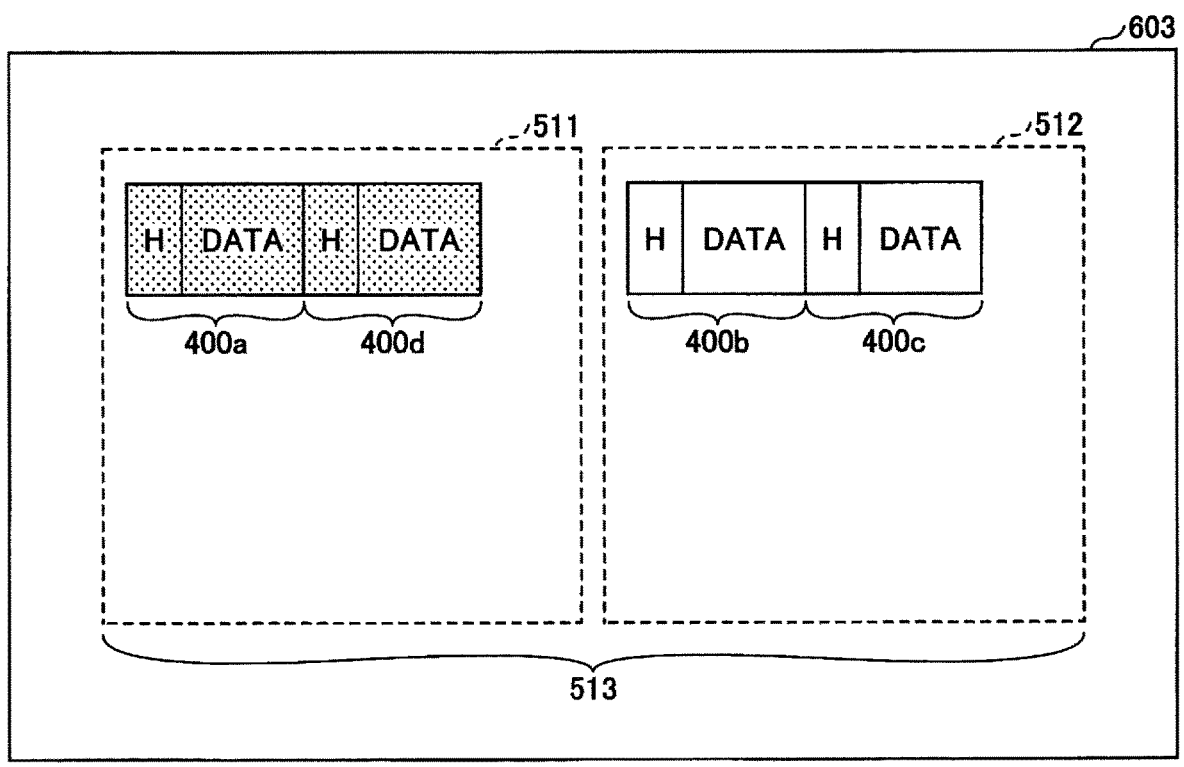

With the above-described configuration, the SDIO I/F 204 transfers wireless LAN packets 400*a*, 400*b*, 400*c*, and 400*d* to different storage areas such as a first storage area 511 and a second storage area 512, as illustrated in FIGS. 5A and 5B, for example, in accordance with the respective communication methods of the wireless LAN packets 400*b* and 400*c*.

FIGS. 5A and 5B are diagrams illustrating the incoming data of the first embodiment. FIG. 5A illustrates a conceptual image of an example of incoming data 500 including wireless LAN packets according to a plurality of communication methods received from the wireless LAN module 110 by the SDIO I/F 204. It is assumed in FIG. 5A that the wireless LAN packets 400*a* and 400*d* are the wireless LAN packets according to the first communication method, and that the wireless LAN packets 400*b* and 400*c* are the wireless LAN packets according to the second communication method. It is also assumed here that "H" and "DATA" in each of the wireless LAN packets 400*a* to 400*d* represent the header 401 and the data 402, respectively, in FIG. 4.

As illustrated in FIG. 5A, the incoming data 500 received from the wireless LAN module 110 includes a mixture of the wireless LAN packets 400*a* and 400*d* according to the first communication method and the wireless LAN packets 400*b* and 400*c* according to the second communication method.

In response to receipt of the incoming data 500 as illustrated in FIG. 5A, for example, the SDIO 1/F 204 transfers the wireless LAN packets 400*a* and 400*d* according to the first communication method in the incoming data 500 to the first storage area 511, as illustrated in FIG. 5B. The SDIO I/F 204 further transfers the wireless LAN packets 400*b* and 400*c* according to the second communication method in the incoming data 500 to the second storage area 512, as illustrated in FIG. 5B. The first storage area 511 and the second storage area 512 are included in a later-described first storage unit 603, for example.

The sub-CPU 202 transfers wireless LAN packets 513 stored in the first storage area 511 and the second storage area 512 to the main system 10 in units of the incoming data 500, for example.

Alternatively, the sub-CPU 202 may transfer the wireless LAN packets 513 stored in the first storage area 511 and the second storage area 512 to the main system 10 in units of the wireless LAN packet. That is, the sub-CPU 202 may individually transfer the wireless LAN packets 513 stored in the first storage area 511 and the second storage area 512 to the main system 10. Thereby, a wireless LAN packet according to a communication method of higher priority, for example, is more preferentially transferred to the main system 10.

A functional configuration of the image forming apparatus 1 of the first embodiment will be described.

Figure 6:
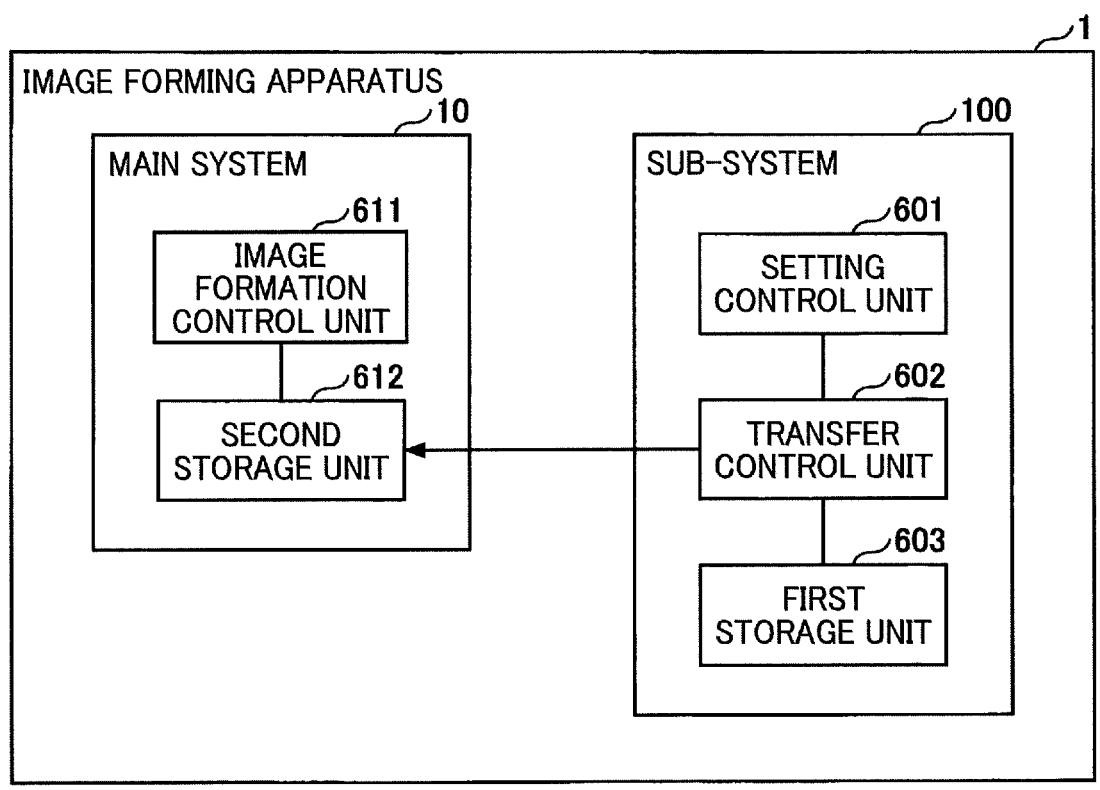
FIG. 6 is a diagram illustrating an example of the functional configuration of the image forming apparatus of the first embodiment.

FIG. 6 is a diagram illustrating an example of the functional configuration of the image forming apparatus 1 of the first embodiment.

In the sub-system 100, the sub-CPU 202 in FIG. 2 executes a particular program, for example, to implement functional units such as a setting control unit 601, a transfer control unit 602, and the first storage unit 603. These functional units may be at least partially implemented by hardware.

Figure 8:
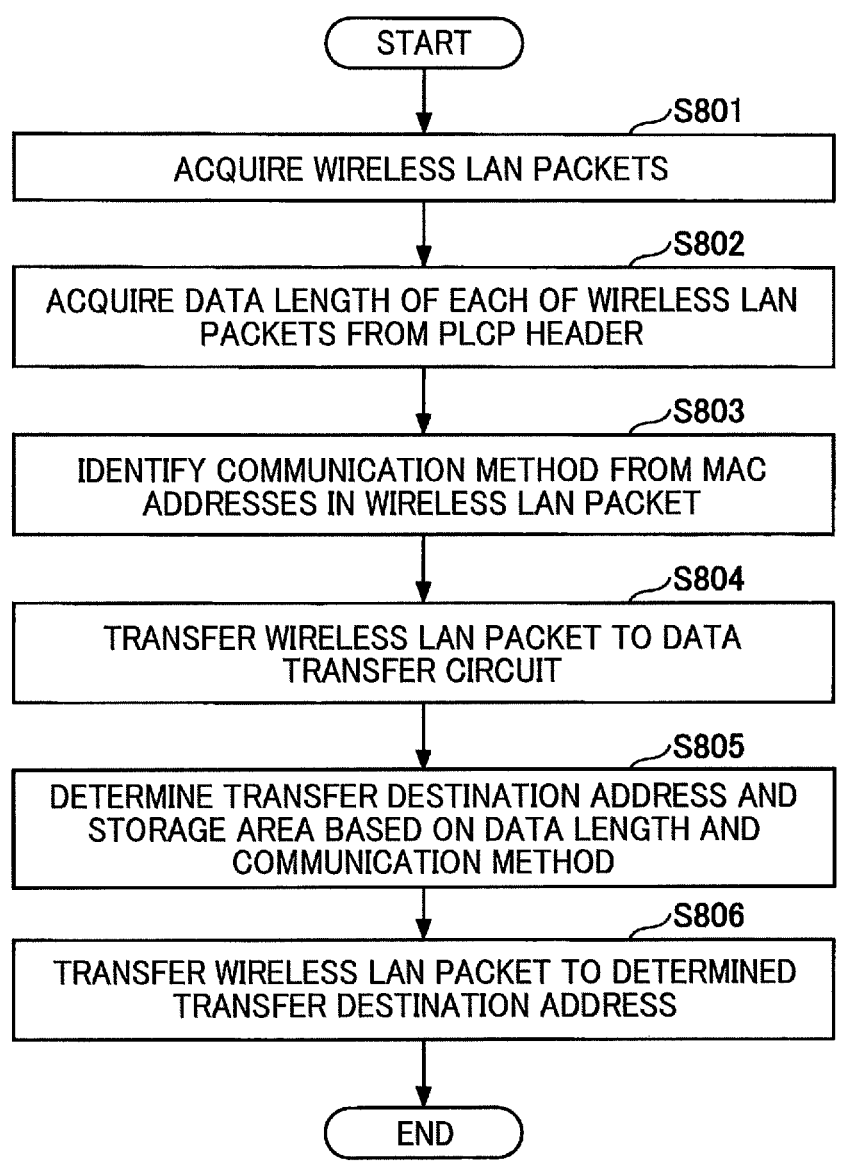
FIG. 8 is a flowchart illustrating an example of an incoming data transfer process of the first embodiment.

The setting control unit 601 controls the SDIO I/F 204 in FIG. 3 to execute a later-described incoming data transfer process as illustrated in FIG. 8, for example.

The transfer control unit 602 executes a transfer process of transferring the wireless LAN packets 513, which are stored in the different storage areas, i.e., the first storage area 511 and the second storage area 512, in accordance with the respective communication methods of the wireless LAN packets 513, to the main system 10, as illustrated in FIG. 5B, for example.

The first storage unit 603 is implemented by a program executed by the sub-CPU 202 and the RAM 203, for example. The first storage unit 603 is used as storage areas such as the first storage area 511 and the second storage area 512, as illustrated in FIG. 5B, for example.

In the main system 10, the CPU 11 in FIG. 1 executes a particular program, for example, to implement functional units such as an image formation control unit 611 and a second storage unit 612.

The image formation control unit 611 executes the image forming process such as the printing process or the scanning process by controlling devices such as the ASIC 13 and the printer 14 or the scanner 15, for example. If the wireless LAN packets 513 transferred to the second storage unit 612 from the sub-system 100 are print data, for example, the image formation control unit 611 prints the print data with the printer 14.

The second storage unit 612 is implemented by a program executed by the CPU 11 and the memory 12, for example. The second storage unit 612 stores, for example, the wireless LAN packets 513 transferred from the sub-system 100.

A procedure of a method for controlling an image forming apparatus of the first embodiment will be described. The method for controlling an image forming apparatus is an example of a method for controlling an electronic apparatus of the present invention.

Figure 7:
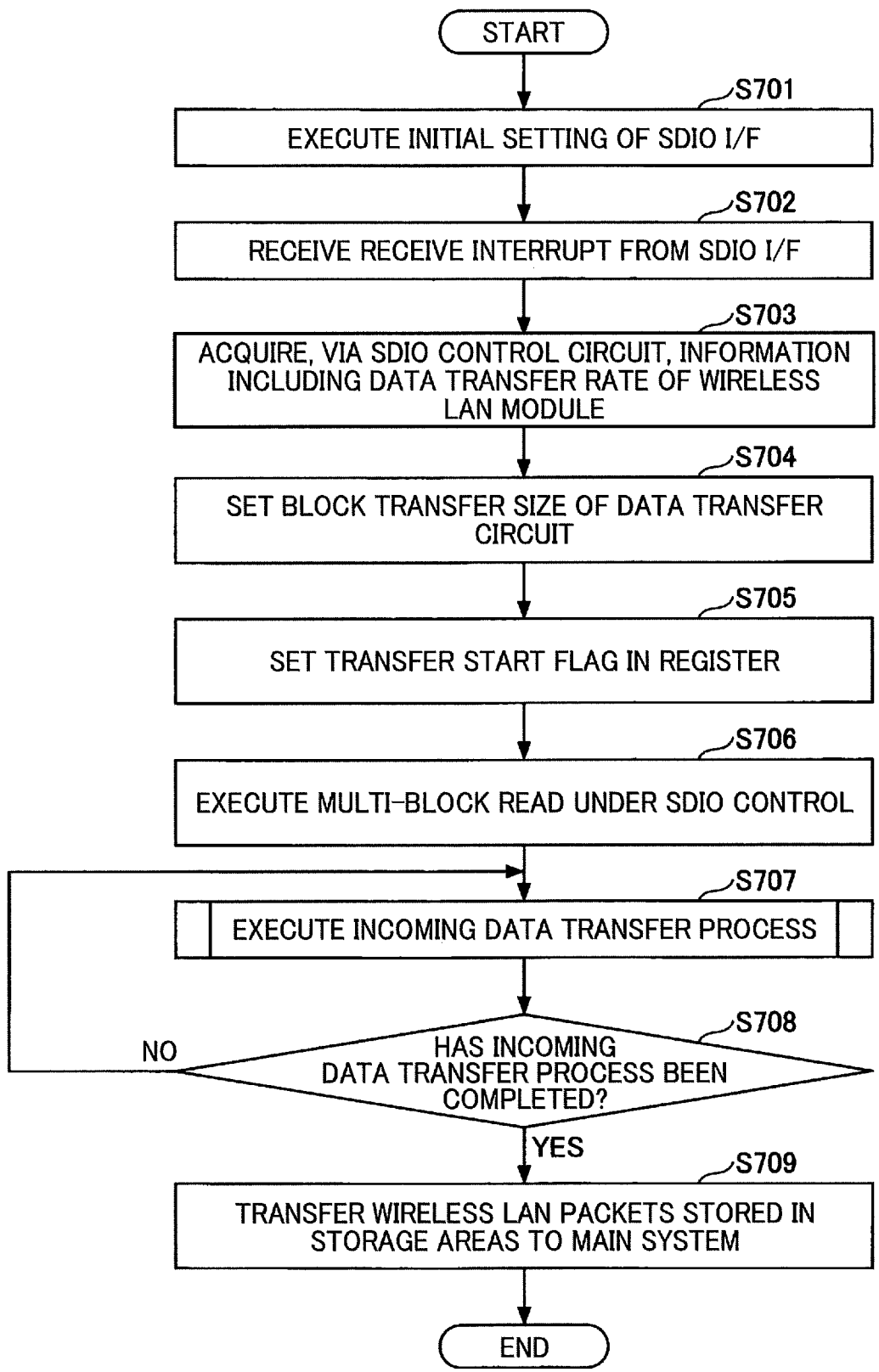
FIG. 7 is a flowchart illustrating an example of a process of the sub-system of the first embodiment.

FIG. 7 is a flowchart illustrating an example of the process of the sub-system 100 of the first embodiment. At step S701, the setting control unit 601 of the sub-system 100 executes initial setting of the SDIO I/F 204. For example, the setting control unit 601 initializes the SDIO I/F 204 and sets, in the register 311, the respective start addresses of the first storage area 511 and the second storage area 512 in FIG. 5B.

At step S702, the setting control unit 601 receives the receive interrupt from the SDIO I/F 204, and the processes of step S703 and the subsequent steps are executed. For example, in response to notification of the receive interrupt from the wireless LAN module 110, the SDIO control circuit 301 of the SDIO I/F 204 notifies the register 311 of the receive interrupt. Then, the register 311 notifies the sub-CPU 202 of the receive interrupt.

At step S703, the setting control unit 601 acquires, via the SDIO control circuit 301, information such as the data transfer rate of the wireless LAN module 110.

At step S704, the setting control unit 601 sets the acquired data transfer rate in the register 311 to set the block transfer size of the data transfer circuit 310.

At step S705, the setting control unit 601 sets a transfer start flag to true (or asserts a kick signal) in the register 311. Thereby, the SDIO control circuit 301 executes multi-block read at step S706 to read the incoming data 500 from the wireless LAN module 110. Consequently, the incoming data 500 including the wireless LAN packets 400*a* and 400*d* according to the first communication method and the wireless LAN packets 400*b* and 400*c* according to the second communication method, as illustrated in FIG. 5A, for example, is received from the wireless LAN module 110.

At steps S707 and S708, the SDIO I/F 204 sequentially executes the incoming data transfer process as illustrated in FIG. 8, for example, on the wireless LAN packets 400*a* to 400*d* included in the incoming data 500. Thereby, the wireless LAN packets 400*a* and 400*d* according to the first communication method included in the incoming data 500 are stored in the first storage area 511, as illustrated in FIG. 5B, for example. Further, the wireless LAN packets 400*b* and 400*c* according to the second communication method included in the incoming data 500 are stored in the second storage area 512.

After the incoming data transfer process is completed, the setting control unit 601 sets the transfer start flag to false (or negates the kick signal). Thereby, a transfer completion interrupt is notified to the sub-CPU 202, for example.

When the incoming data transfer process is completed (YES at step S708), the transfer control unit 602 of the sub-system 100 proceeds to step S709 to transfer the wireless LAN packets 513 stored in the first storage area 511 and the second storage area 512 to the second storage unit 612 of the main system 10. For example, with the data transfer circuit 310 configured as a DMAC, the transfer control unit 602 executes DMA transfer to transfer the wireless LAN packets 513 stored in the first storage area 511 and the second storage area 512 to the second storage unit 612.

The incoming data transfer process of the first embodiment will be described in more detail.

FIG. 8 is a flowchart illustrating an example of the incoming data transfer process of the first embodiment. The example of the incoming data transfer process illustrated in FIG. 8 is executed by the SDIO I/F 204 of the sub-system 100 at step S707 in FIG. 7, for example. For instance, the SDIO I/F 204 sequentially executes the incoming data transfer process illustrated in FIG. 8 on the wireless LAN packets 400 included in the incoming data 500.

At step S801, the data selector circuit 302 acquires the wireless LAN packets 400 from the SDIO control circuit 301.

At step S802, the data length acquisition circuit 303 acquires, from the data selector circuit 302, the information of the PLCP header 403 in each of the wireless LAN packets 400 as illustrated in FIG. 4, for example, and acquires the data length of the wireless LAN packet 400 from the acquired information of the PLCP header 403.

At step S803, the communication method identification circuit 304 acquires, from the data selector circuit 302, the value of the address 1 field 405 and the value of the address 3 field 406 in the wireless LAN packet 400 as illustrated in FIG. 4, for example. The communication method identification circuit 304 further identifies the communication method of the wireless LAN packet 400 based on the acquired values of the address 1 field 405 and the address 3 field 406.

If the value of the address 1 field 405 and the value of the address 3 field 406 are different, for example, the communication method identification circuit 304 identifies the wireless LAN packet 400 as the wireless LAN packet according to the first communication method received from an access point, for example. If the value of the address 1 field 405 and the value of the address 3 field 406 are the same, on the other hand, the communication method identification circuit 304 identifies the wireless LAN packet 400 as the wireless LAN packet according to the second communication method conforming to a standard such as Wi-Fi Direct.

At step S804, the data acquisition circuit 305 acquires the wireless LAN packet 400 as illustrated in FIG. 4, for example, from the data selector circuit 302, and writes the wireless LAN packet 400 to the FIFO circuit 306, to thereby transfer the wireless LAN packet 400 to the data transfer circuit 310.

At step S805, the SDIO I/F 204 determines the transfer destination address and the storage area based on the data length acquired by the data length acquisition unit 303 and the communication method identified by the communication method identification circuit 304.

If the identified communication method is the first communication method, for example, the first address control circuit 307 reads first address stored and managed in the register 311, and outputs the read first address to the selector circuit 309. The first address represents the next write position of the wireless LAN packet according to the first communication method. The selector circuit 309 outputs the first address output from the first address control circuit 307 to the data transfer circuit 310.

If the identified communication method is the second communication method, on the other hand, the second address control circuit 308 reads the second address stored and managed in the register 311, and outputs the read second address to the selector circuit 309. The second address represents the next write position of the wireless LAN packet according to the second communication method. The selector circuit 309 outputs the second address output from the second address control circuit 308 to the data transfer circuit 310.

At step S806, the data transfer circuit 310 performs DMA transfer, for example, to transfer the wireless LAN packet 400 transferred from the data acquisition circuit 305 to the address output from the selector circuit 309.

With the above-described processes in FIGS. 7 and 8, the sub-system 100 transfers the incoming data 500 including the wireless LAN packets 400 according to the plurality of communication methods, as illustrated in FIG. 5A, for example, to the different storage areas, i.e., the first storage area 511 and the second storage areas 512, in accordance with the respective communication methods of the wireless LAN packets 400, as illustrated in FIG. 5B.

Further, as illustrated in FIG. 5B, the sub-system 100 transfers the wireless LAN packets 513, which are stored in the different storage areas, i.e., the first storage area 511 and the second storage areas 512, in accordance with the respective communication methods of the wireless LAN packets 400, to the second storage unit 612 of the main system 10.

According to the present embodiment, therefore, in the image forming apparatus 1 that receives, from the wireless LAN module 110, the incoming data including the packets according to the plurality of communication methods, the load on the processor (i.e., the CPU 11) processing the incoming data is reduced, thereby preventing the processor from leaving some of the incoming data unprocessed.

A description will be given of a second embodiment of the present invention, in which an SDIO I/F 204b includes an address filter circuit.

Figure 9:
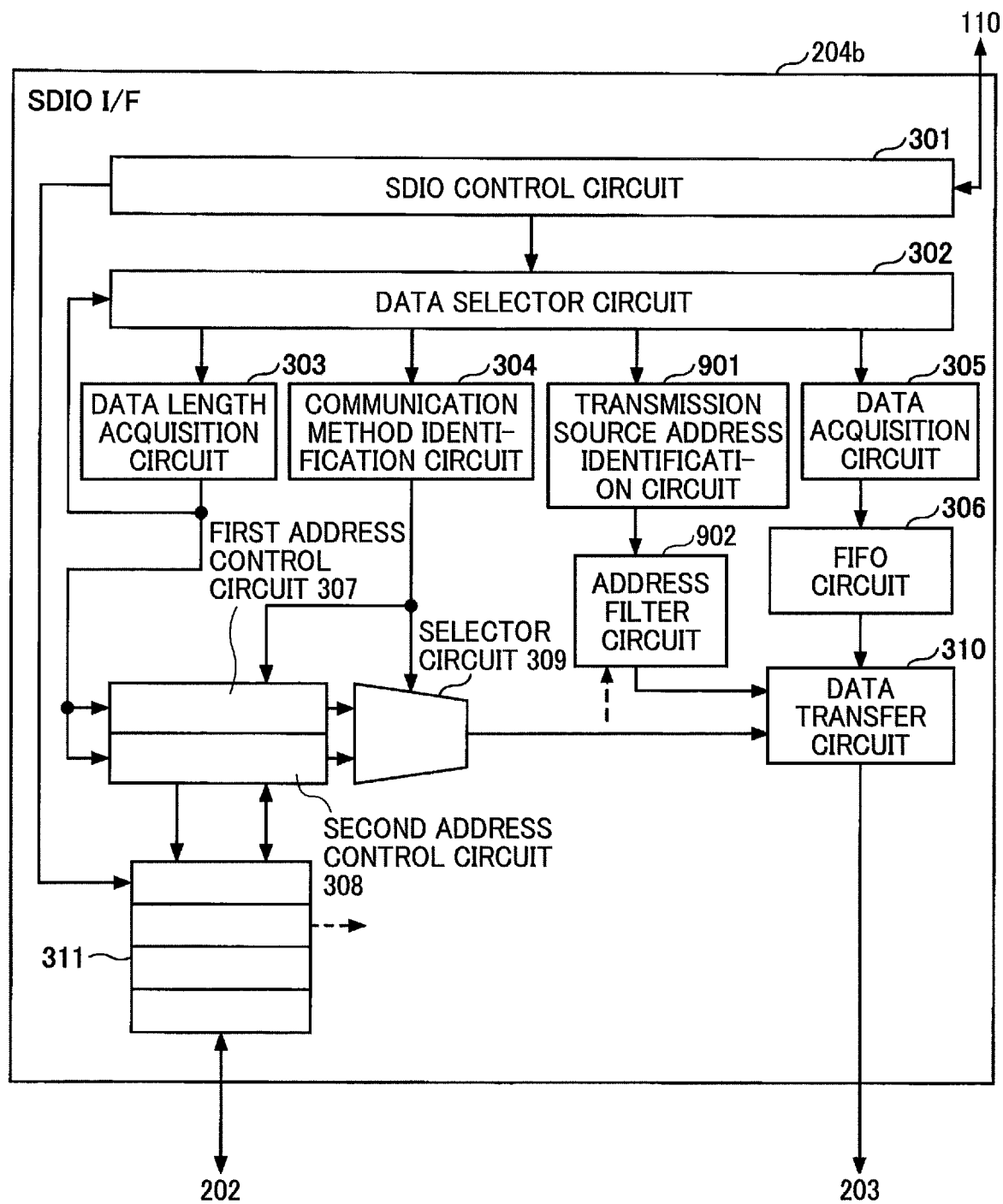
FIG. 9 is a diagram illustrating a configuration example of an SDIO I/F of a second embodiment of the present invention.

FIG. 9 is a diagram illustrating a configuration example of the SDIO I/F 204b of the second embodiment. The SDIO I/F 204b of the second embodiment includes a transmission source address identification circuit 901 and an address filter circuit 902 in addition to the components of the SDIO I/F 204 of the first embodiment illustrated in FIG. 3, for example.

The transmission source address identification circuit 901 acquires, for example, the values of the frame control field 407, the address 1 field 405, and the address 3 field 406 from the wireless LAN packet 400 as illustrated in FIG. 4, for example. The frame control field 407 contains information indicating whether the communication of the transmission source is wired communication or wireless communication. Based on this information, the transmission source address identification circuit 901 identifies one of the value of the address 1 field 405 and the value of the address 3 field 406 as the transmission source address. The transmission source address identification circuit 901 further notifies the address filter circuit 902 of the identified transmission source address (i.e., the transmission source MAC address).

The address filter circuit 902 acquires, from the register 311, at least one MAC address as the filtering target. If the transmission source address notified by the transmission source address identification circuit 901 is included in the at least one MAC address as the filtering target, the address filter circuit 902 outputs a notification signal to the data transfer circuit 310 to notify that the wireless LAN packet 400 corresponds to the filtering target.

In response to receipt from the address filter circuit 902 of the notification signal notifying that the wireless LAN packet 400 corresponds to the filtering target, the data transfer circuit 310 discards the wireless LAN packet 400 stored in the FIFO circuit 306, to thereby suspend the transfer of the wireless LAN packet 400.

A procedure of an incoming data transfer process of the second embodiment will be described.

Figure 10:
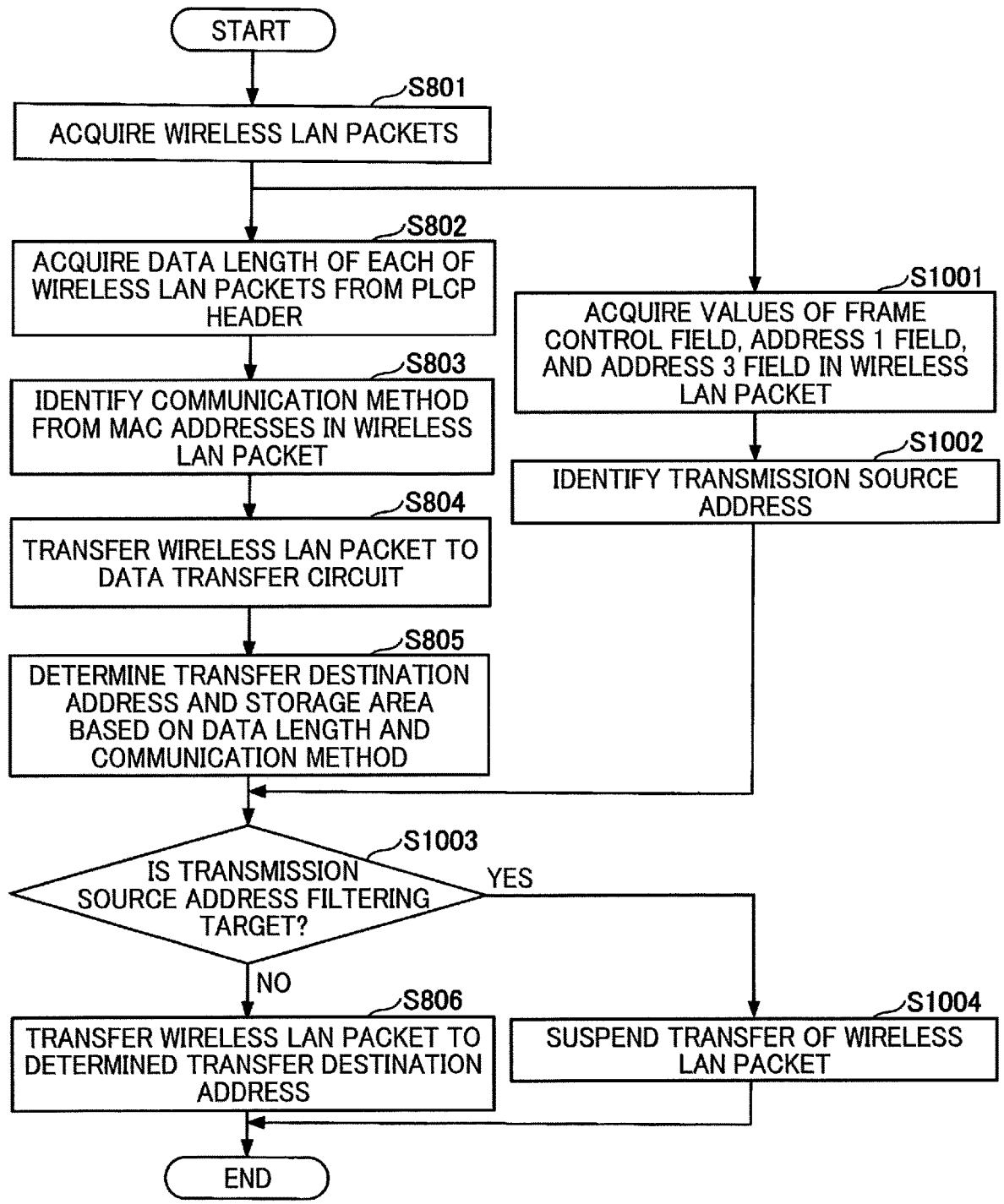
FIG. 10 is a flowchart illustrating an example of an incoming data transfer process of the second embodiment.

FIG. 10 is a flowchart illustrating an example of the incoming data transfer process of the second embodiment. The processes of steps S801 to S806 in the incoming data transfer process of the second embodiment illustrated in FIG. 10 are similar to those in the incoming data transfer process of the first embodiment illustrated in FIG. 8. The following description will therefore focus on differences of the second embodiment from the first embodiment. It is assumed here that, at the start of the incoming data transfer process in FIG. 10, the at least one MAC address as the filtering target has been registered in the register 311.

At step S1001, the transmission source address identification circuit 901 of the SDIO I/F 204b acquires, from the data selector circuit 302, information such as the values of the frame control field 407, the address 1 field 405, and the address 3 field 406 in the wireless LAN packet 400.

At step S1002, based on the acquired values of the frame control field 407, the address 1 field 405, and the address 3 field 406, the transmission source address identification circuit 901 identifies the transmission source address (i.e., the transmission source MAC address) of the wireless LAN packet 400. For example, with reference to the value of the frame control field 407, the transmission source address identification circuit 901 determines whether the communication of the transmission source of the wireless LAN packet 400 is wired communication or wireless communication. Then, based on the result of the determination, the transmission source address identification circuit 901 identifies one of the value of the address 1 field 405 and the value of the address 3 field 406 as the transmission source address.

At step S1003, the address filter circuit 902 determines whether the transmission source address identified by the transmission source address identification circuit 901 is the filtering target. For example, the address filter circuit 902 acquires the at least one MAC address registered in the register 311 as the filtering target. If the transmission source address identified by the transmission source address identification circuit 901 is included in the at least one MAC address as the filtering target, the address filter circuit 902 determines that the identified transmission source address is the filtering target. If the transmission source address identified by the transmission source address identification circuit 901 is not included in the at least one MAC address as the filtering target, on the other hand, the address filter circuit 902 determines that the identified transmission source address is not the filtering target.

If the transmission source address identified by the transmission source address identification circuit 901 is not the filtering target (NO at step S1003), the process of the address filter circuit 902 is followed by the process of step S806. If the transmission source address identified by the transmission source address identification circuit 901 is the filtering target (YES at step S1003), on the other hand, the process of the address filter circuit 902 is followed by the process of step S1004.

At step S1004, the data transfer circuit 310 suspends the transfer of the wireless LAN packet 400. For example, the data transfer circuit 310 discards (i.e., deletes) the wireless LAN packet 400 stored in the FIFO circuit 306.

With the above-described incoming data transfer process, the unnecessary wireless LAN packet 400 is discarded, for example, thereby effectively releasing system buses and thus improving the data transfer efficiency.

According to the embodiments of the present invention, in an electronic apparatus that receives, from a wireless LAN module, incoming data including packets according to a plurality of communication methods, the load on a processor processing the incoming data is reduced, thereby preventing the processor from leaving some of the incoming data unprocessed.

An electronic apparatus in this disclosure includes a sub-system and a main system, for example. The sub-system receives, from a wireless LAN module, incoming data including a plurality of wireless LAN packets according to a plurality of communication methods. The main system processes the incoming data. The sub-system includes a data length acquisition unit, a communication method identification unit, a data transfer unit, and a transfer control unit. The data length acquisition unit acquires the data length of each of the plurality of wireless LAN packets from a header of the each of the plurality of wireless LAN packets. Based on a plurality of MAC addresses included in the each of the plurality of wireless LAN packets, the communication method identification unit identifies a communication method of the each of the plurality of wireless LAN packets. Based on the data length and the communication method of the each of the plurality of wireless LAN packets, the data transfer unit transfers the each of the plurality of wireless LAN packets to one of a plurality of different storage areas respectively corresponding to the plurality of communication methods. The transfer control unit transfers the each of the plurality of wireless LAN packets from the one of the plurality of different storage areas to the main system.

The data length acquisition unit, the communication method identification unit, and the data transfer unit are implemented by hardware, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An electronic apparatus comprising:
a sub-system configured to receive, from a wireless local area network module, incoming data including a plurality of wireless local area network packets according to a plurality of communication methods; and
a main system including a processor configured to process the incoming data,
the sub-system including
an interface circuit configured to
acquire a data length of each of the plurality of wireless local area network packets from a header of the each of the plurality of wireless local area network packets,
based on a plurality of media access control addresses included in the each of the plurality of wireless local area network packets, identify a communication method of the each of the plurality of wireless local area network packets, and
based on the data length and the communication method of the each of the plurality of wireless local area network packets, transfer the each of the plurality of wireless local area network packets to one of a plurality of different storage areas respectively corresponding to the plurality of communication methods, and
a sub-processor configured to transfer the each of the plurality of wireless local area network packets from the one of the plurality of different storage areas to the main system, wherein
the interface circuit of the sub-system includes a selector circuit configured to, in accordance with the communication method of the each of the plurality of wireless local area network packets, select the one of the plurality of different storage areas to which the each of the plurality of wireless local area network packets is transferred.

2. The electronic apparatus of claim 1, wherein the interface circuit of the sub-system includes an address control circuit configured to determine a transfer destination address of the each of the plurality of wireless local area network packets based on the data length and the communication method of the each of the plurality of wireless local area network packets.

3. The electronic apparatus of claim 2, wherein in response to determination of transfer destination address of the each of the plurality of wireless local area network packets, the interface circuit transfers the each of the plurality of wireless local area network packets to the one of the plurality of different storage areas.

4. The electronic apparatus of claim 1, wherein the sub-processor individually transfers the each of the plurality of wireless local area network packets from the one of the plurality of different storage areas to the main system.

5. The electronic apparatus of claim 1, wherein the interface circuit further stores, in a register, at least one media access control address as a filtering target, and
when a transmission source address of the each of the plurality of wireless local area network packets is included in the at least one media access control address as the filtering target, discards the each of the plurality of wireless local area network packets.

6. The electronic apparatus of claim 1, wherein the electronic apparatus is an image forming apparatus, and
wherein the main system executes an image forming process based on the each of the plurality of wireless local area network packets transferred from the sub-system.

7. A method for controlling an electronic apparatus including a sub-system and a main system, performed by the sub-system of the electronic apparatus, the method comprising:
receiving, from a wireless local area network module, incoming data including a plurality of wireless local area network packets according to a plurality of communication methods;
acquiring a data length of each of the plurality of wireless local area network packets from a header of the each of the plurality of wireless local area network packets;
based on a plurality of media access control addresses included in the each of the plurality of wireless local area network packets, identifying a communication method of the each of the plurality of wireless local area network packets;
based on the data length and the communication method of the each of the plurality of wireless local area network packets, transferring the each of the plurality of wireless local area network packets to one of a plurality of different storage areas respectively corresponding to the plurality of communication methods;
transferring the each of the plurality of wireless local area network packets from the one of the plurality of different storage areas to the main system as data to be processed, and
in accordance with the communication method of the each of the plurality of wireless local area network packets, selecting the one of the plurality of different storage areas to which the each of the plurality of wireless local area network packets is transferred.

8. A non-transitory recording medium storing a plurality of instructions which, when executed by one or more processors in a sub-system of an electronic apparatus including the sub-system and a main system, cause the processors to perform a method for controlling the electronic apparatus, the method comprising:
receiving, from a wireless local area network module, incoming data including a plurality of wireless local area network packets according to a plurality of communication methods;
acquiring a data length of each of the plurality of wireless local area network packets from a header of the each of the plurality of wireless local area network packets;
based on a plurality of media access control addresses included in the each of the plurality of wireless local area network packets, identifying a communication method of the each of the plurality of wireless local area network packets;
based on the data length and the communication method of the each of the plurality of wireless local area network packets, transferring the each of the plurality of wireless local area network packets to one of a plurality of different storage areas respectively corresponding to the plurality of communication methods;
transferring the each of the plurality of wireless local area network packets from the one of the plurality of different storage areas to the main system as data to be processed, and
in accordance with the communication method of the each of the plurality of wireless local area network packets, selecting the one of the plurality of different storage areas to which the each of the plurality of wireless local area network packets is transferred.

9. An electronic apparatus comprising: a sub-system configured to receive, from a wireless local area network module, incoming data including a plurality of wireless local area network packets according to a plurality of communication methods; and a main system including a processor configured to process the incoming data, the sub-system including an interface circuit configured to acquire a data length of each of the plurality of wireless local area network packets from a header of the each of the plurality of wireless local area network packets, based on a plurality of media access control addresses included in the each of the plurality of wireless local area network packets, identify a communication method of the each of the plurality of wireless local area network packets, and based on the data length and the communication method of the each of the plurality of wireless local area network packets, transfer the each of the plurality of wireless local area network packets to one of a plurality of different storage areas respectively corresponding to the plurality of communication methods, and a sub-processor configured to transfer the each of the plurality of wireless local area network packets from the one of the plurality of different storage areas to the main system, wherein the interface circuit further selects the one of the plurality of different storage areas to which the each of the plurality of wireless local area network packets is transferred, and stores, in a register, at least one media access control address as a filtering target, and when a transmission source address of the each of the plurality of wireless local area network packets is included in the at least one media access control address as the filtering target, discards the each of the plurality of wireless local area network packets.

10. A method for controlling an electronic apparatus including a sub-system and a main system, performed by the sub-system of the electronic apparatus, the method comprising: receiving, from a wireless local area network module, incoming data including a plurality of wireless local area network packets according to a plurality of communication methods; acquiring a data length of each of the plurality of wireless local area network packets from a header of the each of the plurality of wireless local area network packets;

based on a plurality of media access control addresses included in the each of the plurality of wireless local area network packets, identifying a communication method of the each of the plurality of wireless local area network packets; based on the data length and the communication method of the each of the plurality of wireless local area network packets, transferring the each of the plurality of wireless local area network packets to one of a plurality of different storage areas respectively corresponding to the plurality of communication methods;

transferring the each of the plurality of wireless local area network packets from the one of the plurality of different storage areas to the main system as data to be processed;

selecting the one of the plurality of different storage areas to which the each of the plurality of wireless local area network packets is transferred; storing, in a register, at least one media access control address as a filtering target; and when a transmission source address of the each of the plurality of wireless local area network packets is included in the at least one media access control address as the filtering target, discarding the each of the plurality of wireless local area network packets.

11. A non-transitory recording medium storing a plurality of instructions which, when executed by one or more processors in a sub-system of an electronic apparatus including the sub-system and a main system, cause the processors to perform a method for controlling the electronic apparatus, the method comprising: receiving, from a wireless local area network module, incoming data including a plurality of wireless local area network packets according to a plurality of communication methods; acquiring a data length of each of the plurality of wireless local area network packets from a header of the each of the plurality of wireless local area network packets; based on a plurality of media access control addresses included in the each of the plurality of wireless local area network packets, identifying a communication method of the each of the plurality of wireless local area network packets; based on the data length and the communication method of the each of the plurality of wireless local area network packets, transferring the each of the plurality of wireless local area network packets to one of a plurality of different storage areas respectively corresponding to the plurality of communication methods; transferring the each of the plurality of wireless local area network packets from the one of the plurality of different storage areas to the main system as data to be processed; selecting the one of the plurality of different storage areas to which the each of the plurality of wireless local area network packets is transferred; storing, in a register, at least one media access control address as a filtering target; and when a transmission source address of the each of the plurality of wireless local area network packets is included in the at least one media access control address as the filtering target, discarding the each of the plurality of wireless local area network packets.

* * * * *